Figure 1:
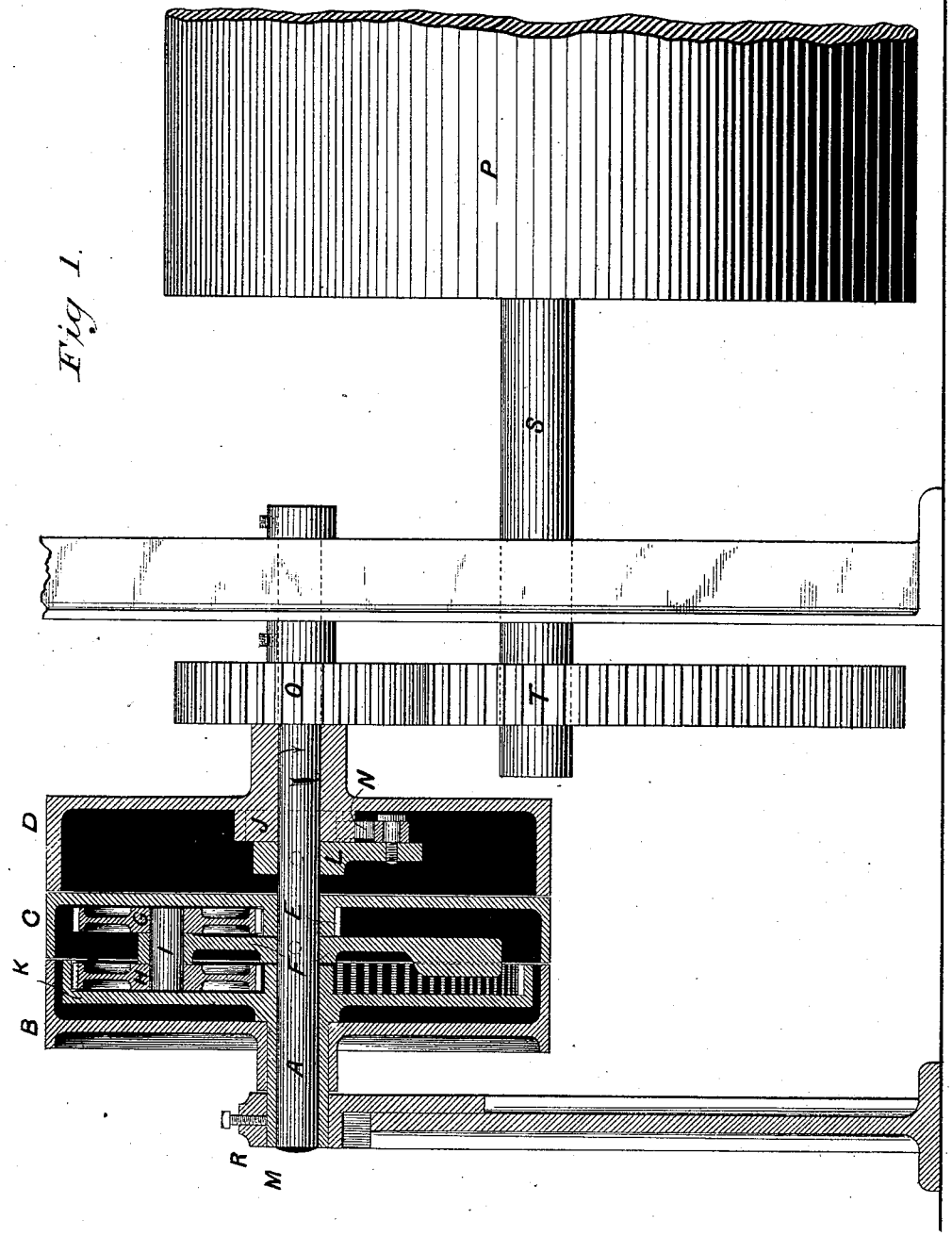

(No Model.)  2 Sheets—Sheet 1.

T. C. ENTWISTLE.
WARPER.

No. 256,205. Patented Apr. 11, 1882.

WITNESSES

INVENTOR
Thomas C. Entwistle
By his Attorney

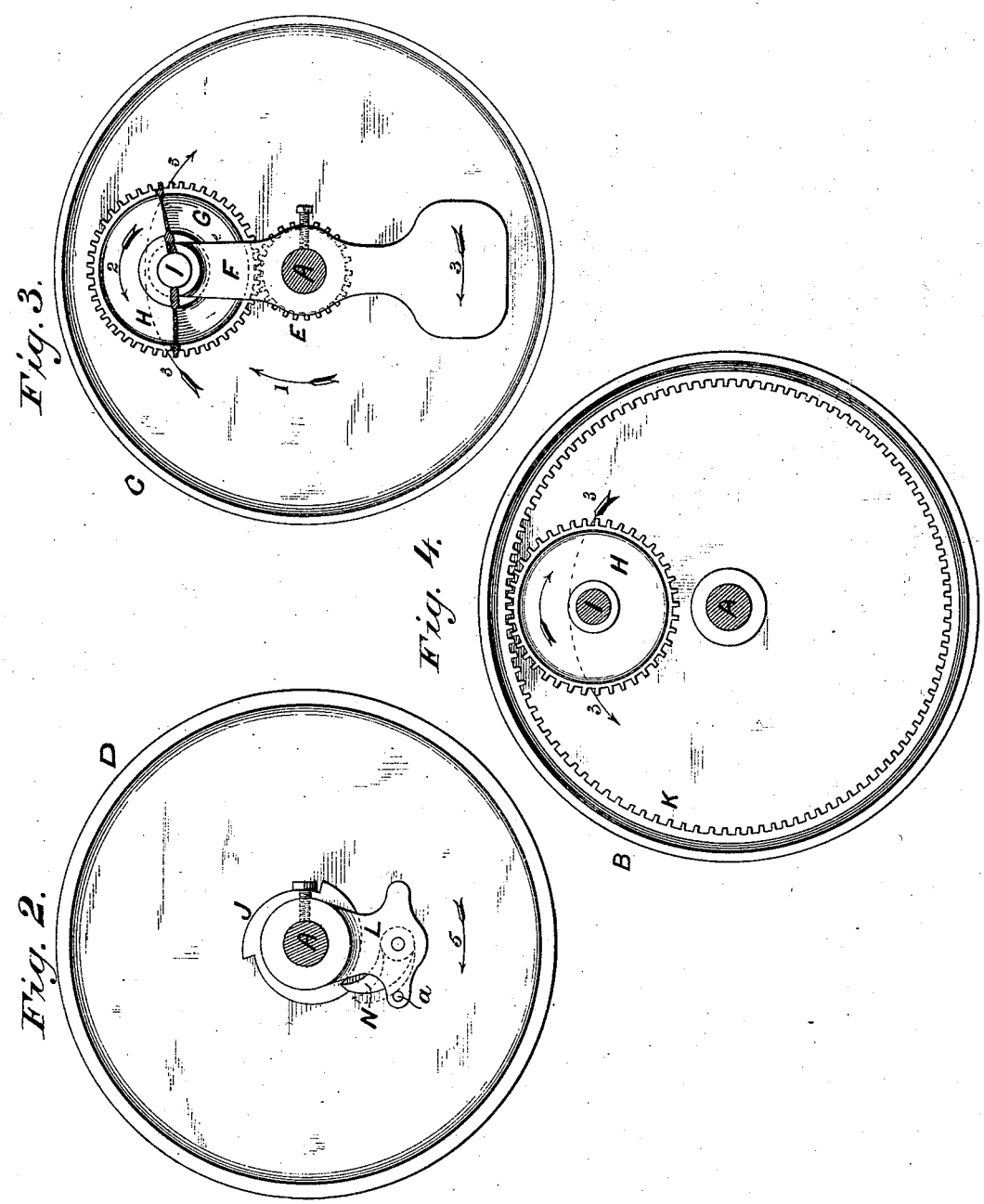

UNITED STATES PATENT OFFICE.

THOMAS C. ENTWISTLE, OF LOWELL, MASSACHUSETTS, ASSIGNOR TO PHENIX MACHINE COMPANY, OF SAME PLACE.

WARPER.

SPECIFICATION forming part of Letters Patent No. 256,205, dated April 11, 1882.

Application filed December 8, 1881. (No model.)

*To all whom it may concern:*

Be it known that I, THOMAS C. ENTWISTLE, of Lowell, in the State of Massachusetts, have invented certain new and useful Improvements in Warpers, of which the following is a specification.

My invention relates to what are known as "slow-motions" for warping-machines, and is an improvement upon the slow-motion mechanism described in Letters Patent issued to the Phenix Machine Company, as my assignee, on the 7th of June, 1881, No. 242,617. In that patented machine, while the several parts of the slow-motion mechanism had their own proper motion relatively to one another when transmitting the desired slow movement to the warper-cylinder, the said mechanism had no motion, except as an entirety, when the cylinder was driven at normal speed from the fast pulley. In my present improvement I go one step further. I organize the parts in such manner that when the machine is running at normal speed not only have the several mechanical instrumentalities composing the slow-motion mechanism no movement relatively to one another, but also the said slow-motion mechanism is at rest in its entirety.

Aside from the manifest advantage of maintaining any mechanism motionless or at rest, except when it is required to do work, it may be stated that my improvement possesses special advantages over the patented mechanism, in that when in the latter case the machine runs at normal speed there is liability of stripping the teeth from the internal gear and the pinions of the slow-motion mechanism, unless the driving-belt be on both the slow and the fast pulleys, so as to cause both to revolve at the same rate of speed, and even when the belt is properly on both pulleys the same liability exists in case the pulley-carrying shaft gets fast or sticks in its bearings, which not unfrequently happens. In my improved mechanism no such liability exists.

Under my invention the slow-motion mechanism acts upon the fast pulley through the intermediary of instrumentalities by which the fast pulley is engaged and driven only when power is applied to the slow-motion pulley, but which, when power is applied directly to the fast pulley, slip by one another, or are automatically out of operative connection, so that movement cannot be imparted through them from the fast pulley to the slow-motion pulley and mechanism. Various mechanical devices for effecting this result manifestly may be employed. The means which on the whole I find to be most convenient are a ratchet on the fast pulley and a pawl on some rotating part—as, for instance, the shaft connected with the slow-motion mechanism. These connecting instrumentalities are illustrated in the accompanying drawings, which I shall now proceed to describe, in order to enable others skilled in the art to fully understand the nature of my invention and the manner in which the same is or may be carried into effect.

Figure 1 is a sectional elevation of so much of a warper as needed for the purposes of explanation, the slow-motion and contiguous devices being represented in vertical section, the plane of which passes through the longitudinal center of the pulley-supporting shaft. Fig. 2 is an internal view of the fast pulley. Fig. 3 is a like view of the slow-motion pulley, representing, also, in proper position the slow-motion cross-head, together with its pinions and the shaft on which it is fixed, one of the pinions, H, being partly broken away to show the other, G, which is behind it. Fig. 4 is an elevation of the fixed internal gear with which one of the pinions of the slow-motion cross-head meshes.

A is a shaft which can revolve. It extends through the pulleys B C D, the frame, and the bracket or stand R, to which latter is fixed by a set-screw or otherwise the hub M of a stationary internal gear, K. The shaft has its bearing in the hub M. B is the loose pulley, loosely mounted on hub M and encircling with its overhanging rim the fixed internal gear K. C is the intermediate or slow-motion pulley. D is the fast pulley. Both pulleys are loose on the shaft.

On the hub of the slow-motion pulley C is a fixed pinion, E. Upon shaft A, intermediate between the pulley C and stationary internal gear K, is fixed a cross-head, F, which carries two pinions or toothed wheels, G H, secured fast upon one and the same shaft or axle I. The wheel G meshes with pinion E, and the wheel H with internal gear, K. Within the fast pulley D is formed, on its hub, a ratchet, J, and upon the shaft A, adjoining the ratchet, is firmly secured a boss or cross-head, L, carrying a vibratory pawl, N, whose movement is limited by a pin, $a$, on the cross-head, and which is arranged to extend into the path of the ratchet so as to engage it. The pin $a$ is placed to allow the pawl enough play to clear the ratchet; but whenever the shaft A is revolved the pawl will, when carried around by the shaft, be brought above the ratchet, so that it will drop into engagement with the same. A pinion, O, carried by the fast pulley imparts rotary movement to the shaft S of warper-cylinder P through the toothed wheel T on said shaft.

The operation of the above-described parts is as follows: To start the machine the belt is shifted from the loose pulley B to the slow-motion pulley C, which, together with its pinion E, is put in revolution in the direction of arrow 1 in Fig. 3. Pinion E rotates the wheel G, which imparts corresponding movement to its fellow wheel, H, in the direction of arrow 2 in Fig. 3; but as wheel H meshes with the fixed internal gear K the effect is to rotate the cross-head F in the direction of arrow 3 in Fig. 3. The shaft A is consequently rotated in a like direction, and thus the pawl carrying cross-head L, which partakes of the movement of the shaft, will be rotated in the direction of arrow 5 in Fig. 2, with the effect of causing its pawl to engage the ratchet J and rotate the fast pulley D. The slow motion thus imparted to the fast pulley is through the parts O S T communicated to the warper-cylinder. To give the fast motion or normal speed to the machine, the belt is now slipped along onto the fast or driving pulley D. As soon as the belt is fairly on the pulley D, although it may also be in part still on the pulley C, the ratchet E, following the pulley D, which now receives motion directly from the belt, leaves the more slowly moving pawl, and as soon as the belt is all on the fast pulley the slow-motion mechanism comes to a stop, the pawl of that mechanism riding over the positively-driven ratchet without engaging the same. Thus when the belt is on the fast pulley and the machine is running at its normal speed all parts of the slow-motion mechanism are out of engagement with the driven pulley and that mechanism in its entirety is at rest.

Having now described my invention and the manner in which the same is or may be carried into effect, what I claim, and desire to secure by Letters Patent, is—

1. A slow-motion mechanism for warping or other machines, constructed, arranged, and operating substantially as hereinbefore set forth, so that when the power is transferred from the slow-motion mechanism to the device by which the machine is driven at its normal or fast speed said slow-motion mechanism in its entirety will automatically be brought to rest.

2. The combination, with the slow-motion pulley and fast or driving pulley, of intermediate slow-motion-transmitting mechanism actuated by the slow-motion pulley, and connected with the fast pulley substantially in the manner hereinbefore set forth, so that when the belt is shifted from the slow to the fast pulley the said mechanism will automatically be thrown out of engagement with said fast pulley.

3. The combination, with the fast and the slow motion pulleys, of intermediate slow-motion-transmitting mechanism, connected with the fast pulley by a pawl-and-ratchet connection, substantially as and for the purposes hereinbefore set forth.

4. The combination, substantially as hereinbefore set forth, of the fast and slow motion pulleys, provided respectively with ratchet and pinion, as described, the stationary internal gear, the shaft, the slow-motion cross-head, fixed to said shaft and carrying two gear-wheels, meshing one with the slow-motion pulley-pinion and the other with the internal gear, the pawl-carrying cross-head, fixed also on said shaft, and the pawl.

In testimony whereof I have hereunto set my hand this 3d day of December, 1881.

THOMAS C. ENTWISTLE.

Witnesses:
WILLIAM ED. WHITEHEAD,
EDWARD E. RIPLEY.